United States Patent [19]

Trimble

[11] Patent Number: 4,957,227

[45] Date of Patent: Sep. 18, 1990

[54] SADDLE MOUNTED BICYCLE WATER BOTTLE CARRIER

[75] Inventor: James Trimble, Natick, Mass.

[73] Assignee: Trimble Design Inc.

[21] Appl. No.: 335,696

[22] Filed: Apr. 10, 1989

[51] Int. Cl.[5] .......................... B62J 7/00; B62J 11/00
[52] U.S. Cl. .................................... 224/39; 280/288.4;
297/191; 297/192; 224/30 R; 224/32 R;
224/275
[58] Field of Search ...................... 297/188, 191, 197;
224/39, 30 R, 32 R, 37, 38, 275; 280/288.4

[56] References Cited

U.S. PATENT DOCUMENTS

| 4,009,810 | 3/1977 | Shook | 224/39 |
| 4,366,922 | 1/1983 | Levine et al. | 224/32 R |
| 4,566,617 | 1/1986 | Jackson | 224/275 |
| 4,643,343 | 2/1987 | Goldman et al. | 224/275 |
| 4,830,240 | 5/1989 | Tackles et al. | 224/38 X |

FOREIGN PATENT DOCUMENTS

| 2615158 | 11/1988 | France | 224/39 |
| 459558 | 9/1950 | Italy | 224/39 |
| 23034 | of 1894 | United Kingdom | 224/32 R |
| 385741 | 1/1933 | United Kingdom | 224/32 R |
| 829662 | 3/1960 | United Kingdom | 224/32 R |

OTHER PUBLICATIONS

"Wavelength" Advertisment from *Triathelete Magazine* Apr. 1988.

Primary Examiner—Ernest G. Cusick

[57] ABSTRACT

A carrier for one or more water bottles attaches to the support rails of a bicycle saddle. A bracket, which can take several configurations, includes clamping structure at one end to attach to ends of the support rails and at the other ends has the structure to support one or more water bottles. The carrier positions the one or more water bottles rearwardly of the rider's buttocks and thighs so as to reduce aerodynamic drag while riding.

9 Claims, 1 Drawing Sheet

SADDLE MOUNTED BICYCLE WATER BOTTLE CARRIER

BACKGROUND OF THE INVENTION

1. Field of the Invention:

This invention relates generally to water bottle carriers, and more particularly, to a water bottle carrier which is secured to the support frame of a bicycle saddle.

2. Description of the Prior Art:

Previous water bottle carriers for bicycles have been attached to the frame tubes or the handlebars of the bicycle.

SUMMARY OF THE INVENTION

A support assembly for locating one or more water bottles behind the saddle of a bicycle is set forth herein. A standard bicycle saddle has support rails which provide support for a bracket assembly which in turn locates the one or more water bottles behind the rider's buttocks and thighs. This location provides an aerodynamic streamlining effect, by filling in and occupying a portion of the turbulent airspace behind the rider, which is created by the forward motion though the air. It also allows the bottles to be conveniently removed and replaced while riding, without excessive bending down. It is no longer necessary to carry the bottles in the traditional locations on the bicycle frame tubes, where they are exposed to air flow during riding, which results in an additional reduction in aerodynamic drag.

DESCRIPTION OF THE PREFERRED EMBODIMENT

Figure 1:
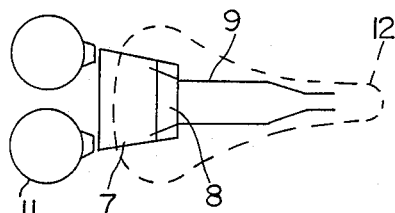
FIG. 1 is a plan view of the invention, showing a bracket of a generally rectangular shape, wherein two water bottles are mounted in side-by-side relation, on the support bars of a bicycle saddle.

A conventional bicycle saddle 12 includes support rails 9. These are used to support various items, including saddlebags, maps, or the like. Here a bracket 7, which is constructed of any suitable sheet, molded, or wire material, is attached to the support rails at the rear of the saddle 12 by a clamping means 8.

The bracket extends from the rear end of the rails, and provides support for one or more water bottles in a manner to be described hereafter. The bracket extends from the clamp at one end and at the other end is "free" or unsupported, so as to be "cantilevered" from the support rails. The free end may be provided with mounting means, such as a standard water bottle cage 10 or the free end of the bracket itself maybe formed to support the bottles 11 directly.

The bracket can be formed of aluminum sheet material and be bent into the appropriate configuration for supporting the one or more water bottles. In FIG. 1, the bracket 7 is generally rectangular, but expands outwardly away from the rear end of the saddle 12, and attaches at the clamping means 8 to both support rails 9. FIGS. 2-4 and 6 illustrate other configurations for the bracket.

Figure 2:
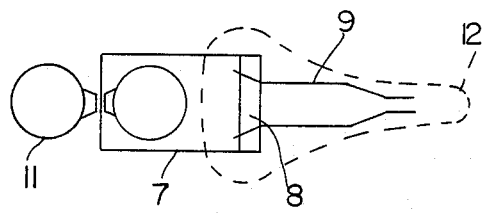
FIG. 2 is a plan view of another embodiment of the invention, wherein the bracket is generally rectangular in shape, mounts to the support rails of the saddle and supports two bottles in tandem or front-to-back relationship.

In FIG. 2, the bracket 7 is rectangular and also attaches to the rear end of the support bars 9 at the clamping means 8. The bottles 11 are mounted one behind the other, as is seen in the Figure.

Figure 3:
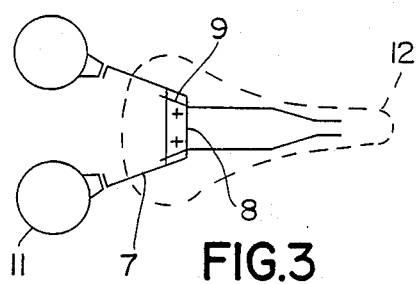
FIG. 3 is a plan view of another embodiment of the invention, wherein the bracket takes the form of a U-shaped or channel shaped bracket attached to the support rails of the saddle and the water bottles are mounted in side-to-side relationship.

In FIG. 3, the bracket 7 is U or channel shaped. Two arms of the bracket 7 expand outwardly from each other and extend from the clamping means 8, which is attached to both support rails 9.

Figure 4:
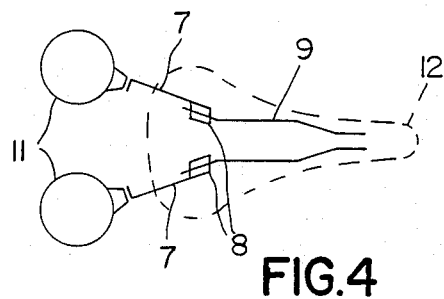
FIG. 4 is a plan view of another embodiment of the invention, wherein the bracket takes the form of two separate brackets, each mounted to the support rails of the bicycle.
Figure 5:
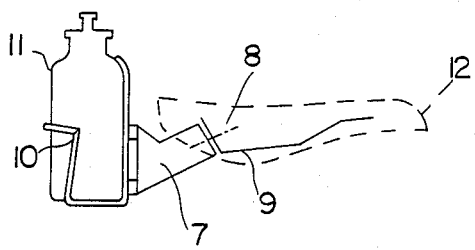
FIG. 5 is a side view of the invention showing the relationship of the bracket to the water bottles and the support rails of a saddle.

In FIG. 4, the bracket 7 is configured as two separate brackets, one end of each attached at the clamping means to an end of one of the support rails 9. As in the embodiment of FIG. 3, these brackets also expand outwardly from each other.

Figure 6:
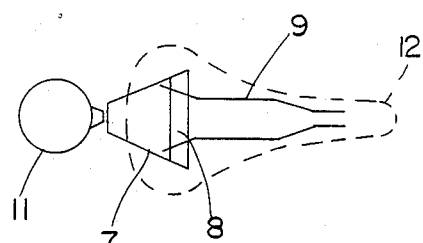
FIG. 6 is a plan view of yet another embodiment of the invention and show a single water bottle supported on the support rails of a bicycle saddle, in which the bracket takes the form of a truncated triangle.

In FIG. 6, the bracket 7 takes the form of a truncated triangle, wherein the truncated end supports the water bottle and the "base" of the triangle defines the clamping means 8 and is attached to the support rails 9.

Having described the invention, what is claimed is:

1. A carrier for one or more water bottles in combination with a bicycle seat saddle comprising:
   a bicycle seat saddle having supports rails on an underside of the saddle;
   said support rails having ends, one of the ends of the support rails positioned at the rear of the saddle;
   a bracket having two ends, one end of the bracket attached to said one end of the support rails;
   means attached to the other end of the bracket for supporting one or more water bottles.

2. The carrier of claim 1 wherein said bracket locates the means for supporting one or more water bottles behind a user's buttocks and thighs while the user is sitting on the saddle to thereby create an aerodynamic streamlining effect around the user, reducing aerodynamic drag while riding.

3. The carrier of claim 1 wherein the bracket comprises a channel shaped configuration including a clamping means at said one end of the bracket and a pair of extending legs, said clamping means attaching to said one end of the support rails and said pair of legs including the means for supporting one or more water bottles.

4. The carrier of claim 1 wherein the bracket comprises a generally rectangularly shaped configuration including clamping means for attaching to said one end of the support rails.

5. The carrier of claim 4 wherein said means for supporting one or more water bottles includes means to position two water bottles in a front-to-back relationship.

6. The carrier of claim 4 wherein said means for supporting one or more water bottles includes means to position two water bottles in a side-to-side relationship.

7. The carrier of claim 1 wherein the bracket comprises a generally truncated triangularly shaped configuration, wherein the base of the generally truncated triangularly shaped configuration includes clamping means attaching to the one end of the support rails and the truncated apex of the truncated triangularly shaped configuration includes said means for supporting one or more water bottles.

8. The carrier of claim 1 wherein the means for supporting one or more water bottles is formed as an integral part of the bracket.

9. The carrier of claim 1 wherein the bracket includes attachment means for attaching conventional water bottle cages to the bracket.

* * * * *